(12) United States Patent
Hagglund et al.

(10) Patent No.: US 6,584,101 B2
(45) Date of Patent: Jun. 24, 2003

(54) COMMUNICATION METHOD FOR PACKET SWITCHING SYSTEMS

(75) Inventors: Barry Benjamin Hagglund, Port Coquitlam (CA); Thomas Alexander, Mulino, OR (US); Vernon Robert Little, Belcarra (CA)

(73) Assignee: PMC-Sierra Ltd., Burnaby (CA)

(*) Notice: Subject to any disclaimer, the term of this patent is extended or adjusted under 35 U.S.C. 154(b) by 0 days.

(21) Appl. No.: 09/205,728

(22) Filed: Dec. 4, 1998

(65) Prior Publication Data

US 2002/0110120 A1 Aug. 15, 2002

(51) Int. Cl.$^7$ ............................................. H04L 12/28
(52) U.S. Cl. ...................... 370/389; 370/412; 370/462; 709/238
(58) Field of Search ................................ 370/389, 400, 370/401, 412, 413, 414, 428, 429, 911, 912, 462; 709/232, 236, 237, 239, 243, 245, 238

(56) References Cited

U.S. PATENT DOCUMENTS

| | | | |
|---|---|---|---|
| 4,486,739 A | | 12/1984 | Franaszek et al. |
| 4,748,658 A | * | 5/1988 | Gopal et al. ............... 379/221 |
| 5,014,221 A | * | 5/1991 | Mogul ........................ 364/519 |
| 5,361,372 A | * | 11/1994 | Rege et al. .................. 395/800 |
| 5,509,061 A | * | 4/1996 | Amereller et al. .......... 379/207 |
| 5,640,495 A | * | 6/1997 | Colbert et al. .............. 395/112 |
| 5,765,023 A | * | 6/1998 | Leger et al. ................. 395/842 |
| 5,781,799 A | * | 7/1998 | Leger et al. ................. 395/842 |
| 5,878,217 A | * | 3/1999 | Cherukuri ............... 395/200.42 |
| 5,978,876 A | * | 11/1999 | Greaves ...................... 710/107 |
| 5,982,994 A | * | 11/1999 | Mori et al. .................. 395/114 |
| 6,028,837 A | * | 2/2000 | Miller ........................ 370/222 |
| 6,075,615 A | * | 6/2000 | Nakamura ................. 358/1.14 |
| 6,081,522 A | * | 6/2000 | Hendel et al. .............. 370/389 |
| 6,213,652 B1 | * | 4/2001 | Suzuki et al. ............... 395/114 |

OTHER PUBLICATIONS

IEEE Std. 1596.3–1996—IEEE Standard for Low–Voltage Differential Signals (LVDS) for Scalable Coherent Interface (SCI), Jul. 31, 1996.
IEEE Std. 1596.5–1993—IEEE Standard for Shared–Data Formats Optimized for Scalable Coherent Interface (SCI) Processors, Apr. 25, 1994.
IEEE Std 1596–1992—IEEE Standard for Scalable Coherent Interface (SCI) May 23, 2001.
ANSI NCITS 332–1999—Fiber Channel Arbitrated Loop (FC–AL–2).
ANSI X3.148–1998—Fiber Distributed Data Interface (FDDI)—Token Ring Physical Layer Protocol (PHY).
ANSI X3.166–1990—Fiber Data Distributed Interface (FDDI)—Toekn Ring Physical Layer Medium Dependent (PMD).
ANSI X3.139–1987—Fiber Distributed Data Interface (FDDI)—Token Ring Media Access Control (MAC).
ANSI X3.230–1994—Fiber Channel—Physical and Signaling Interface (FC–PH).

(List continued on next page.)

*Primary Examiner*—Hassan Kizou
*Assistant Examiner*—John Pezzlo
(74) *Attorney, Agent, or Firm*—Shapiro Cohen

(57) ABSTRACT

A method of communicating data frames between nodes in a network comprised of one or more end system nodes where each end system node has a unidirectional ingress port and a unidirectional egress port. The method comprises transmitting a data frame from an egress port of one end system node to the ingress port of another end system node, the receiving end system node then determining whether it is the final destination for the data frame. If the receiving end system node is the final destination of the data frame, the receiving end system node absorbs the message. If not, the receiving end system node buffers and then retransmits the data frame through its own egress port. The method provides scalability, low cost, distributed pipeline scheduling, maximum complexity of the network fabric, and maximum speed.

17 Claims, 4 Drawing Sheets

OTHER PUBLICATIONS

Figure 1:
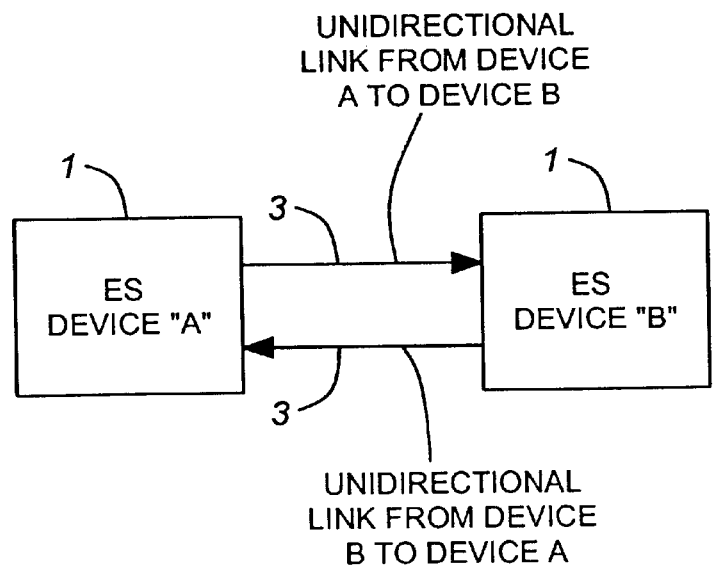

Adminission Control and Routing in ATM Networks Using Inferences from Measured Buffer Occupany, IEEE Trans. on Communications, Feb./Mar./Apr. 1995.

Architecutres for ATM Switching Systems, IEEE Communications Magazine, Feb., 1993.

Switching Fabrics with internal Backpressure Using the ATLAS I Single–Chip ATM Switch, IEEE Globecom'97 Conference, Nov. 1997.

ATLAS I: A General Purpose, Single–Chip ATM Switch with Credit–Based Flow Control, IEEE Hot Interconnects IV Symposium Proceedings, Aug., 1996.

A DC–Balanced, Partitioned–Block 8B/10B Transmission Code, IBM, Sep. 1983.

Performance of the SCI Ring, ACM Publication, 1992.

Pipelined Multi–Queue Management in a VLSI ATM Switch Chip with Credit–Based Flow–Control IEEE, 1997.

National Semiconductor QR0001 Quick Ring Data Stream Controller, Preliminary, Oct., 1994.

MIL–STD–2204—Survivable Adaptable Fiber Optic Embedded Network (SAFENET), May 4, 1998.

MIL–HDBK–818—Survivable Adaptable Fiber Optic Embedded Network (SAFENET) Network Development Guidance, Oct. 31, 1992.

Ellen W. Zegura "Impact of Multichip Module Technology on ATM Switch Architecture", presented at Third ORSA Telecommunications Conference, Boca Raton, Florida, Mar. 1995.

* cited by examiner

COMMUNICATION METHOD FOR PACKET SWITCHING SYSTEMS

FIELD OF THE INVENTION

This invention relates to the field of data transmission, and in particular to a method of routing data messages in a digital switching network.

BACKGROUND TO THE INVENTION

Data switching networks are generally configured with data transceivers (nodes) connected in ring structures or in star structures. As is well known, in the ring structure, for example, data signals are transmitted around the ring, with each transceiver detecting whether its address is at the head of a frame. If so, it accepts the frame of data. In star networks, there is a central switching system through which each message passes, which detects the addresses and routes the messages to the particular arm of the star to which the addressed node is connected.

Well known switching networks conform to the FDDI, FC and SCI standards, and fall into two general classes:

1. Output buffered architectures which associate data storage with the transmit side of a port of a node. This structure simplifies input ports since data can be sent directly from the receive port of the node to its output port without scheduling or storage. However, the switching fabric of the network which interconnects ports must have excess bandwidth approaching twice the port bandwidth per attached port. In addition, the output port must have all the scheduling, storage and ordering capabilities of the switch since there is no other inherent way in the node to control traffic destined for the output port.
2. Input buffered switches which store data immediately on the receive side of the port. This eliminates the complexities of the output buffered switch with respect to speed and overlay traffic control. Data can be stored independently of the state of the other ports or the state of the interconnecting switching mechanism. However, for this type of switch, the state of the output port must be known before the data can be sent through the switching interconnection.

In the input buffered switch type of switching structure, the output port state has been obtained by an out of band scheduling mechanism, or by using a reservation protocol. Reservation protocols require the synchronization of distributed state machines with arbitrary loads and timings. Centralizing the scheduling eliminates the advantages of the protocol approach while still requiring the protocol elements. However, distributed schedulers would require buffering on both input and output ports that would greatly increase the cost of the switch.

Whether distributed or centralized, out of band scheduling cannot be scaled in number of nodes, and therefore is inflexible. Reservation protocols have provided the most flexible solution but involve complex scheduling and distributed arbitration.

SUMMARY OF THE INVENTION

The present invention is comprised of embodiments which can provide a distributed switch that could be easily expanded across multiple interconnection fabrics and an arbitrary number of nodes. It uses an embedded protocol which is used for distributed scheduling, as distinct from resource reservation. This eliminates the requirement for arbitration among shared resources and requires only physical link feedback and arrival time state information to be processed at the egress port of the node.

The present invention provides scalability, low cost, distributed pipeline scheduling, a single point of data buffering, no external arbiters or schedulers, and allows maximum complexity of the network fabric and maximum speed. To obtain these advantages, the present invention has a stateless, distributed control messaging structure, associates outputs within an input only buffered memory, utilizes a unidirectional point-to-point electrical network interconnection structure, and eliminates any centralized devices while maintaining seamless growth via an unidirectional handshaking protocol.

In accordance with an embodiment of the invention, a method of communicating frames of data in a network comprised of nodes, each node having an unidirectional ingress port and an unidirectional egress port, comprises transmitting messages from the egress port of a source node to the ingress port of a destination address, determining whether an address in the message represents the destination node and if so absorbing the message, and if not buffering the message as bypass data prior to transmission out of the egress port of the destination node to an ingress port of a downstream node.

In accordance with another embodiment, a method of communicating in a network comprised of one or more end system (ES) nodes, each ES node having a unidirectional ingress and a unidirectional egress port, wherein an egress port of one ES node is coupled to the ingress port of itself or of another ES node and wherein a message frame transmitted from the egress port of any ES node can reach the ingress port of an ES node of the network, comprises:

(a) from a source ES node egress port which has a message frame to be transmitted to an ingress port of itself or of another destination ES node, transmitting a queue allocation request, (b) allocating a buffer having a predetermined data block size in the destination ES node, and transmitting a queue fetch request from the destination ES node to the source ES node, (c) receiving the queue fetch request at the first ES node and in response transmitting the predetermined data block of the message frame from the source ES node to the destination ES node, and (d) detecting a destination address in the message frame at the destination ES node and either routing the message to the local resource or to its egress port for retransmission to another ES node.

BRIEF INTRODUCTION TO THE DRAWINGS

Figure 2:
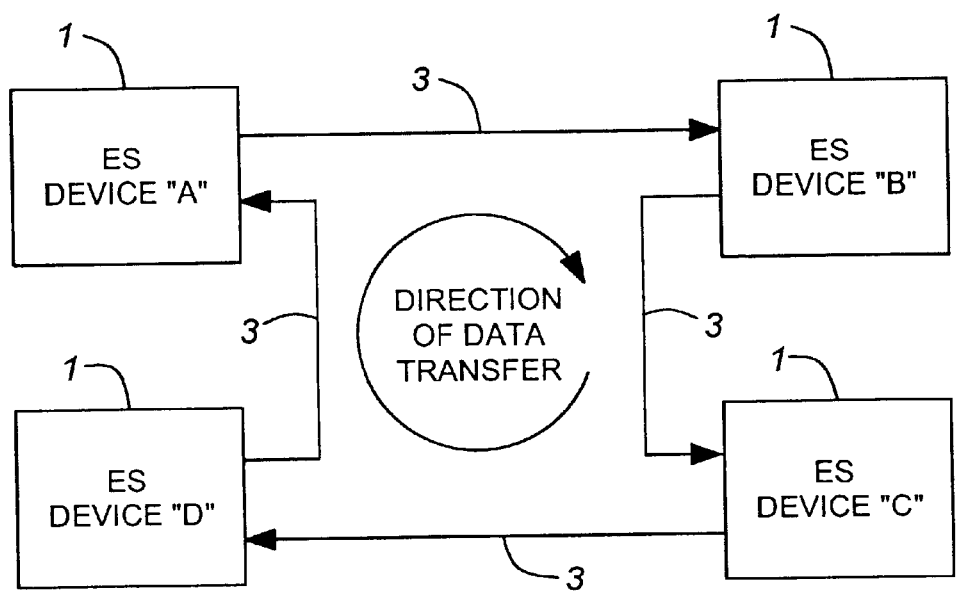
Figure 3:
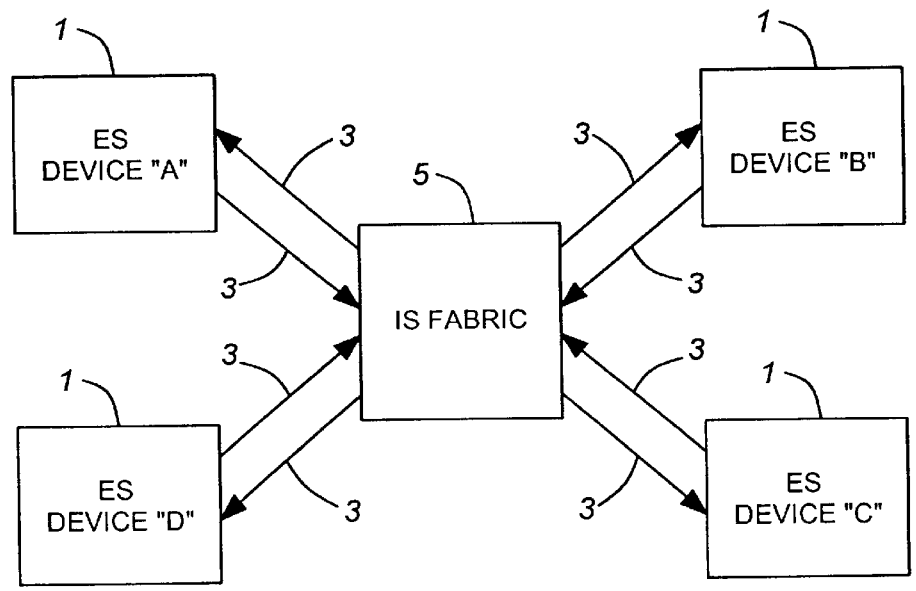
Figure 4:
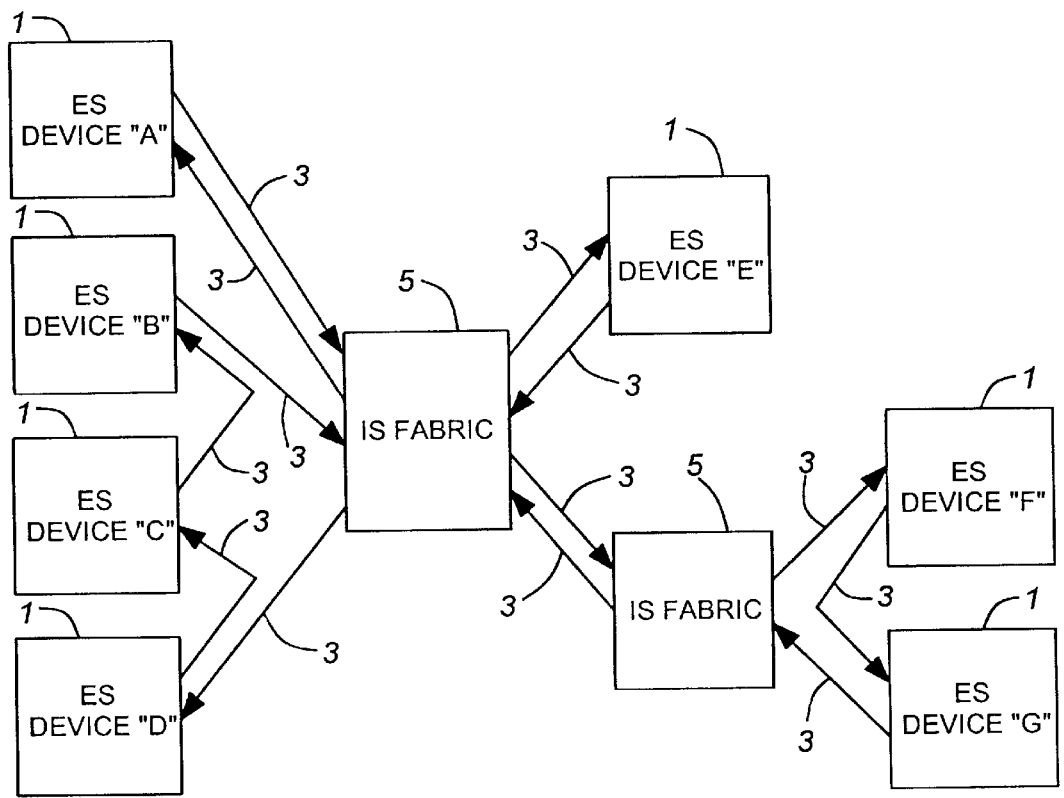
Figure 5:
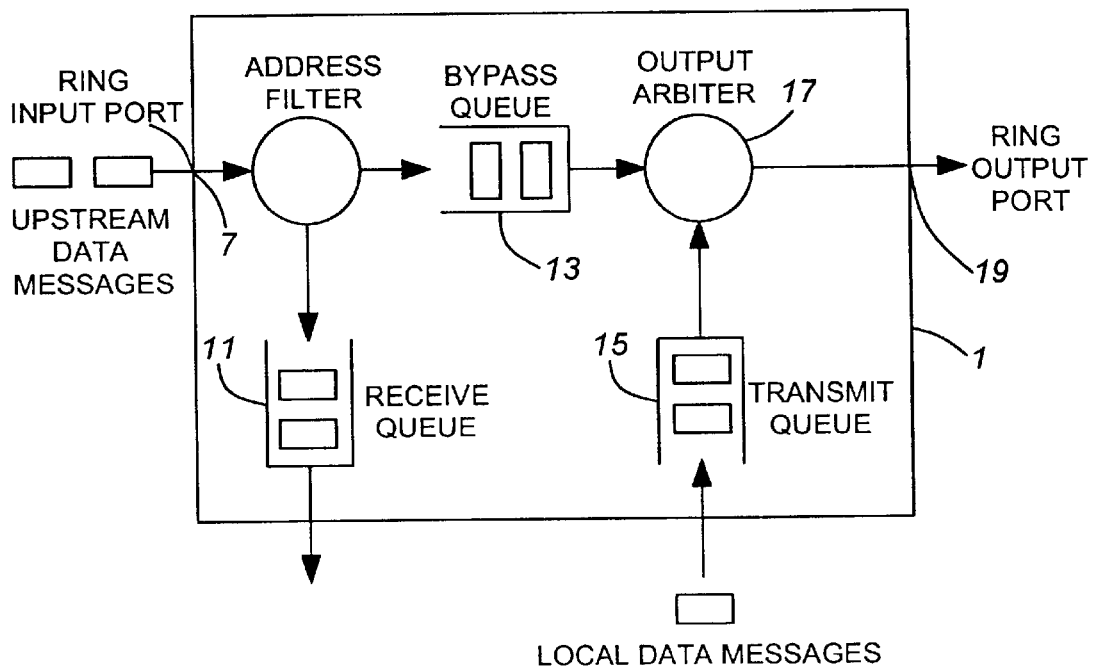
Figure 6:
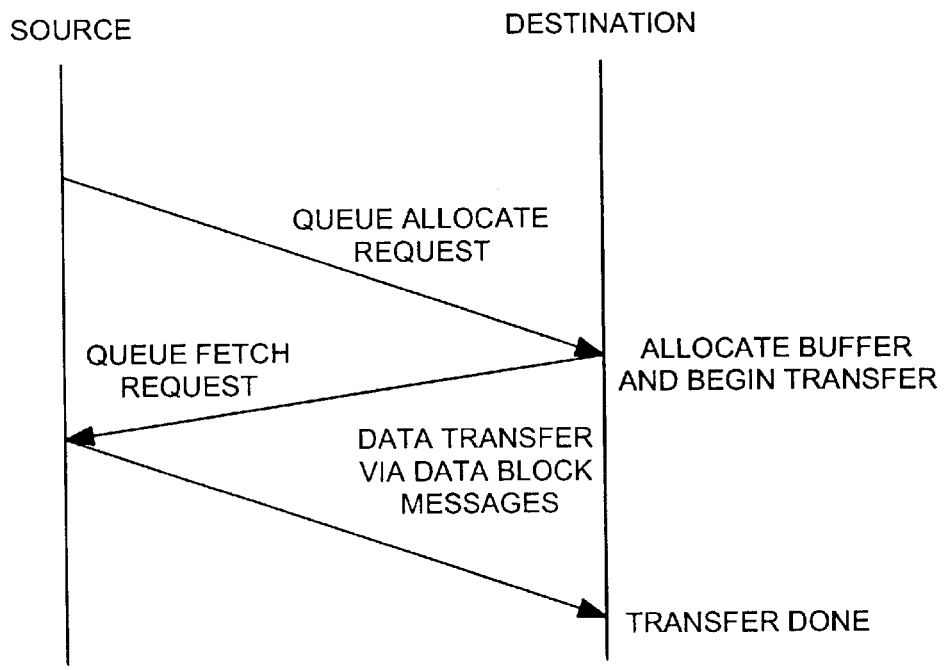
Figure 7:
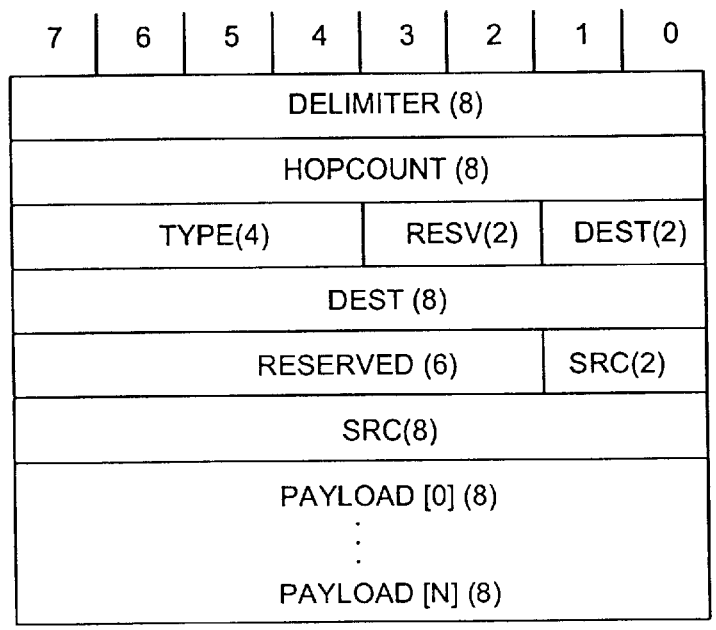
Figure 8:
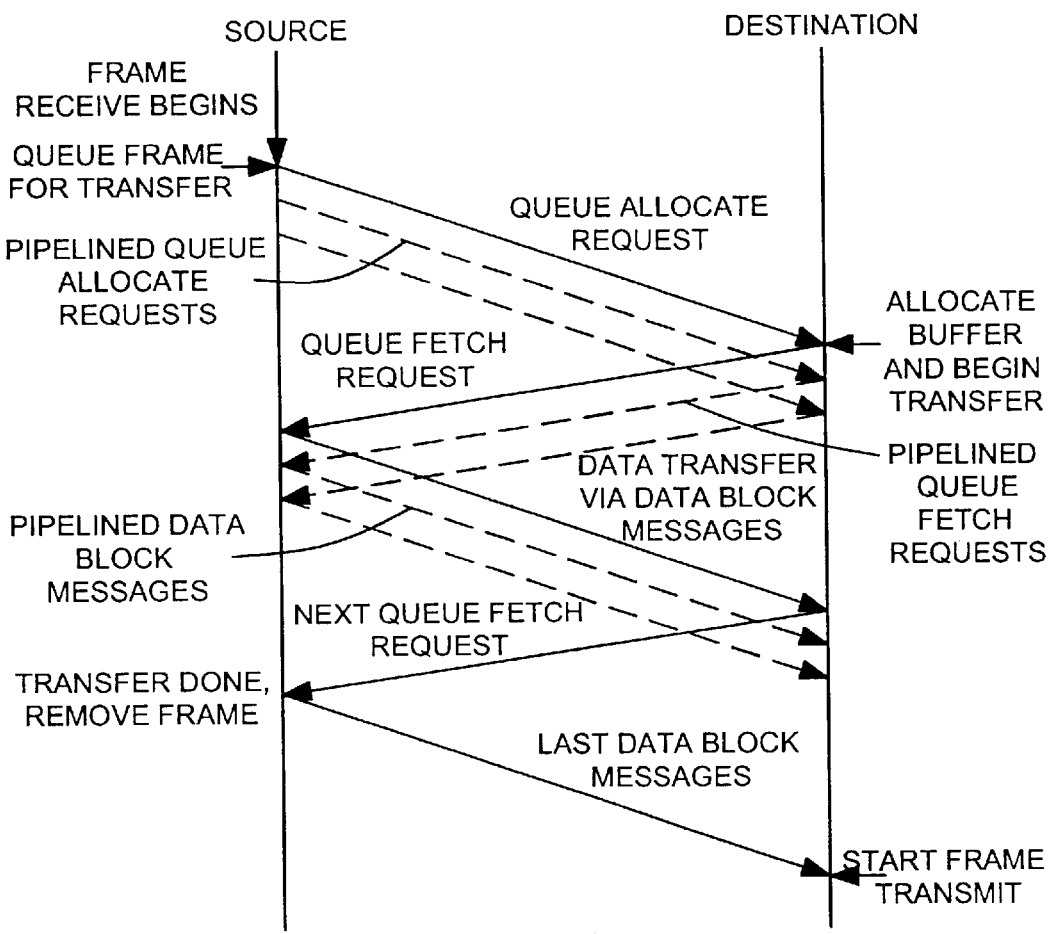

A better understanding of the invention will be obtained by considering the detailed description below, with reference to the following drawings, in which:

FIG. 1 is a block diagram of two interconnected nodes in accordance with one embodiment, FIG. 2 is a block diagram of several interconnected nodes in a ring network, FIG. 3 is a block diagram of several interconnected nodes in a star network, FIG. 4 is a block diagram of several interconnected nodes in a combination ring and star network, FIG. 5 is a block diagram of a node in accordance with an embodiment of the present invention, FIG. 6 is a communication sequence diagram, FIG. 7 illustrates a preferred form of bus message, and FIG. 8 is a more detailed communication sequence diagram of FIG. 6.

DETAILED DESCRIPTION OF EMBODIMENTS OF THE INVENTION

Turning to FIG. 1, a simplest form of a network comprising a pair of nodes 1 is shown, which are interconnected by a pair of unidirectional links 3 (transmission paths) which carry data in opposite directions from each respective node to the other. The nodes are labelled and are referred to as end systems (ES) (as distinct from switching devices which merely route data, and which are referred to as intermediate systems (IS)).

FIG. 2 illustrates four nodes 1 which are interconnected in a ring network, with the egress port of one node coupled to the ingress port of the next via unidirectional transmission links 3.

As may be seen, the unidirectional nature of message flow exists with only four point-to-point links being used to connect the four nodes (devices). The ES devices bypass or forward messages from their ingress to their egress ports if they determine, by inspecting the destination addresses carried within the messages, that it is necessary to do so. Thus a message originating at device "D" that is destined for device "C" would have to bypass devices "A" and "B" based on the destination address. A device is permitted to be both a source and a sink for any message.

Turning to FIG. 3, a star topology for the network is shown. In this topology a switch fabric (or intermediate system IS 5) is used to accept messages, determine their ultimate destinations by inspecting the destination addresses encoded into the messages, and forward them to the intended destination via the appropriate egress port of the IS). It is permitted for a given ES to require the IS to forward messages back to itself, which causes the device to be both the source and sink of a message. By this structure, there is no specific restriction on the IS construction to whether it is used in a single or multistage matrix or switch system.

Ring and star topologies can be combined in various ways to create more complex configurations, as illustrated in FIG. 4. There is at least one path from each ES 1 to every ES including itself, with which it is to communicate. For redundancy and fault-tolerance purposes, multiple paths can be provided between any ES pair, as long as all but one of the paths is disabled at any given time.

The communication protocol is comprised of three layers:

(a) the physical layer which is responsible for the transmission of signals from source to sink devices, (b) the coding layer, which is responsible for low level symbol coding which encodes data and control characters which is transferred across the physical signalling layer (e.g. for error detecting, D.C. line balance, in-band coding of data and control characters), and (c) the messaging layer, which is responsible for addressing and message formats (e.g. transfer handshakes used to transport data from one device to another, framing format for encapsulating payloads, handshake sequences which permit source and sink devices to communicate).

In the physical layer, each link is comprised of a bus which can be either a parallel link (bus) or a serial link (bus). External serializer-deserializer devices are used to generate the serial links.

Each pair of point to point links which constitute a parallel bus segment preferably is comprised of 23 signals, with 22 of the signals being mandatory and the remaining being optional. Table A below contains a description of these signals.

TABLE A

| Name | Size | Type | Usage | Description |
| --- | --- | --- | --- | --- |
| XRXD[9:0] | 10 | Input | Mandatory | Receive data bus |
| XRCLK | 1 | Input | Mandatory | Primary receive clock |
| XRCLKN | 1 | Input | Optional | Inverted receive clock |
| XTXD[9:0] | 10 | Output | Mandatory | Transmit data bus |
| XTCLK | 1 | Output | Mandatory | Transmit clock |

Each parallel bus signal is a point-to-point connection between two and only two nodes. Data is transferred on the 10-bit data buses XRXD(9:0) and XTXD(9:0) synchronously to all corresponding clocks (XRCLK/SRCLKN) respectively. The logic levels on all of the signals are preferably such that a logic "1" is represented by a logical high signal and a logic "0" is represented by a logical low signal.

The serial bus signal is also a point-to-point connection between two and only two nodes, but requires only 4 signals, all of which are mandatory, as described in Table B below.

TABLE B

| Name | Size | Type | Usage | Description |
| --- | --- | --- | --- | --- |
| DIP | 1 | Input | Mandatory | Serial receive data input (positive) |
| DIN | 1 | Input | Mandatory | Serial receive data input (negative |
| DOP | 1 | Output | Mandatory | Serial transmit data output (positive) |
| DON | 1 | Output | Mandatory | Serial transmit data output (negative) |

Each ES or IS device which implements a serial bus segment must place serialized data on its DOP signal and the complement of the same data on the DON signal. It must also recover clock and data from the true and complement versions of the bit stream input on the DIP and DIN signals.

Serial and parallel bus segments may be combined in any fashion. However, a serial format should not be used for one link of the pair of links while using a parallel format for the other link in the pair.

Any node which supports a parallel bus segment should implement the distinct configuration modes for generating and accepting clock and data information on its incoming and outgoing links, as shown in Table C shown below.

TABLE C

| Mode | Mnemonic | Description |
| --- | --- | --- |
| Mode 1 | Clear-Channel Mode | 8-bit binary-coded receive data, together with an even parity bit and a delimiter signal, are transferred on XRXD[9:—] synchronously with the rising and falling edges of XRCK; XRCLKN is not used. 8-bit binary coded transmit data are transferred on XTXD[9:0] synchronously with the rising and falling edges of XTCLK. |

TABLE C-continued

| Mode | Mnemonic | Description |
| --- | --- | --- |
| Mode 2 | SERDES Mode | 8B/10B coded receive data are transferred on XRXD[9:0] synchronously with the rising edges of both XrCLK and XRCLKN, with one symbol being transferred on each rising edge. 8B/10B coded transmit data are transferred on XTXD[9:0] synchronously with the rising edges of XTCLK. |

Thus as noted above, the buses may be used to interconnect multiple devices in a serial fashion, forming a simple insertion ring by coupling the egress port of a given node with the ingress port of the next node. Each node in this context is referred to as a ring node.

Data received on the ingress port of a particular node is terminated (i.e. is removed from the ring) if the data is destined for the node and no other node. Data not destined for a given node must be forwarded (bypassed) to the egress port so that it may be eventually transferred to the intended destination.

Since an ES node in a ring has only a single output port, there is competition between local data generated at the node itself, and data entering the node ingress port, generated by an upstream node, for the bandwidth available on the egress port. The access priority of the egress port between locally generated and externally generated (and bypassed) data must be resolved.

Resolution of the access priority is preferred to comprise two distinct flow control methods. One method operates at the node level, and regulates the instantaneous access to the output port between data being generated locally and data being generated by an upstream device that must be bypassed. The other method operates at the ring level, and implements a flow control process for ensuring that all devices have fair access to the ring bandwidth. Resolution of flow access priority is particularly important when the ring is either oversubscribed or has a large number of active subscribers.

One ring access method is to always give priority to bypass traffic in preference to locally generated traffic. Another is to allocate priority based on a ratio or inverse ratio of queued bypass and locally generated traffic. Another is to allocate priority based on the already incurred storage time for the message. Another can be based on the relative or absolute fractions of capacity of the respective bypass and transmit queues that are filled. Other methods can be used.

Turning to FIG. 5, a block diagram of the pertinent elements of a node is illustrated. Upstream data messages are received via an ingress port 7. The received messages are examined by an address filter 9, which determines whether the received messages are destined for resources associated with this node, or whether they are destined for another node. If they are destined for resources associated with this node, they are passed into a receive queue 11 (register), and if they are destined for another node, they are passed into a bypass queue 13.

Locally generated data messages are stored in a transmit queue 15. An output arbiter 17 determines whether the data messages stored in the bypass queue or the data messages stored in the transmit queue should be passed to the egress (ring output) port 19.

The ingress port of the node thus receives a stream of messages from an upstream node in the ring (which may be from itself, if there is only one node in the ring). Messages that are determined to be exclusively addressed to the node are removed from the input stream and are written to the receive queue. Messages that are determined to be exclusively addressed to some other node are not written to the receive queue, but instead are placed into a bypass queue. Broadcast messages (i.e. messages that are simultaneously addressed to both the node itself and to other nodes in the system) are copied to the receive queue as well as being placed into the bypass queue. The bypass queue thus contains messages that must be forwarded to downstream nodes in the ring, while the receive queue holds messages addressed to the given node by upstream nodes in the ring.

The egress port of the node must select from and transmit messages from two queues. Locally generated messages (i.e. messages originated by this node and destined for downstream nodes) are queued for output in the transmit queue; forwarded messages are present in the bypass queue, as already described. The output arbiter determines, on a message by message basis, whether the next transmit message should be taken from the transmit queue or from the bypass queue. In both cases, the transmission of messages should be done on a first-in first-out basis.

If no messages are available to be sent in both the transmit and bypass queues, the arbiter should inject IDLE characters to maintain ring synchronization. IDLE/BUSY and FILL characters received by a ring node should not be placed into the bypass queue, but should instead be discarded.

Some representative arbitration policies have been described earlier. However they should be designed specifically for the implementation used. It should guarantee however that messages should never be dropped from the bypass queue due to lack of storage space, regardless of the nature of the traffic on the ingress ring port. This may cause the arbiter to cause transmit messages to be dropped from the transmit queue due to lack of space, unless a flow control method is implemented.

Two distinct types of physical layer coding are preferred to be used on the switch network ring, and which is used should depend on the operating mode of the various nodes on the ring. The first, normal coding, employs the 8B/10B line code for encoding data and control characters. The 8B/10B coding method is described in U.S. Pat. No. 4,486,739 issued Dec. 4, 1984, invented by Peter A. Franaszek et al, which is incorporated herein by reference.

The second, an alternate coding method, can be an optional coding method, wherein data and control characters are transferred as binary-coded symbols, with a special delimiter signal which is also supplied to distinguish between the two.

In normal operation, each bus carries a constant stream of symbols. No tri-state or quiescent value is used. When no data or control characters are being transferred, a special set of idle characters should be continuously driven on to the bus with the appropriate clock and control signals. These idle characters are removed from the ingress port data stream by each node, and are reinserted as required into the egress port data stream by every port.

Data should be transferred in the form of messages, which contain a number of data characters delimited by special BUSY or IDLE control characters. Each message should be preceded and terminated by one BUSY or IDLE character. The selection between a BUSY and an IDLE character should be determined by a flow control mechanism. It is permissible for the same IDLE or BUSY character to both terminate a given message and also precede the next message (i.e. there need by only one IDLE or BUSY character separating any two messages).

An odd number of characters should be inserted between every pair of BUSY or IDLE synchronization characters. A set of FILL control characters is provided for this purpose. If a message consisting of only data characters is an even number of characters long, a FILL character should be appended to the message before the terminating BUSY or IDLE character. This FILL character is stripped out of the incoming data stream by the receiving node and is not considered part of the message.

The idle state on the ring (i.e. when no data are available to be transmitted) is indicated by a repeated sequence of IDLE/BUSY and FILL characters. The minimum number of characters that may be transferred during an idle state on the ring is thus 2. To support multiple clock domains a node may transmit fewer idle symbols (i.e. pairs of IDLE/BUSY and FILL characters) on its egress port as compared to its ingress port. This can compensate for transient clock phase or frequency differences, subject to the minimum of one IDLE/BUSY character between data messages.

In the 8B/10B coding mode (see the above-noted patent), data are encoded as convention 8B/10B data symbols (e.g. D0.0 or D27.1), and control characters (IDLE/BUSY, etc.) use reserved special codes (referred to as the K28.5 comma character definitions). Table D below describes the data codes alphabet preferred to be used on the bus.

TABLE D

| Indication | Code Pair | Data[9:0] Encoding |
| --- | --- | --- |
| NBI+(not busy, idle, positive running disparity) | IDLE, FILLP | K28.5, K29.7 |
| NBI−(not busy, idle, negative running disparity) | IDLE, FILLN | K28.5, K28.6 |
| NBD+(not busy, data, positive running disparity) | IDLE, DATA+ | K28.5, D0.0–D31.7 |
| NBD−(not busy, data, negative running disparity) | IDLE,DATA− | K28.5, D0.0–D31.7 |
| BI+(busy, idle, positive running disparity) | BUSY, FILLP | K28.1, K29.7 |
| BI−(busy, idle, negative running disparity) | BUSY, FILLN | K28.1, K28.6 |
| BD+(busy, data, positive running disparity) | BUSY, DATA+ | K28.1, D0.0–D31.7 |
| BD−(busy, data, negative running disparity) | BUSY,DATA− | K28.1, D0.0–D31.7 |

Each 8B/10B data character carries 8 bits of information. As described in the aforenoted patent, the coding varies for a given data value depending on the running disparity, computed over all of the characters that have been transmitted previously on the same link. Two distinct characters are used to represent each data value, depending on whether the running disparity at the end of the transmission of the previous character was positive or negative.

Control codes are indicated by the use of special 8B/10B characters: these characters do not correspond to any valid data symbol, and can hence be unambiguously distinguished. There are five special 8B/10B characters used to control signaling: IDLE, BUSY, ERROR, FILLP and FILLN. BUSY and IDLE are used to indicate the start of a message and the status of the ring. The ERROR code is used by an IS or ES device to indicate that an 8B/10B line code error was detected. FILLP and FILLN codes are used to pad a data stream to an even number of bytes, and are used for a positive and a negative running disparity, respectively.

As mentioned previously, a data stream in accordance with this embodiment should contain an odd number of bytes between IDLE/BUSY synchronization characters for proper operation. Two FILL characters are therefore used for this purpose. FILLP is used when the current running disparity is positive, and FILLN is used when the running disparity is negative. If a message contains an odd number of DATA bytes, however, no FILL character need be used before the first IDLE/BUSY character.

If a line code error has occurred during transmission, the IS or ES node that detects the error should replace the character in error with the special ERROR control character. This ensures that the error notification will be propagated to all nodes on the ring.

In the case of binary coded data transfer mode (referred to as clear-channel mode), no special coding of data characters need be employed. Instead, the most-significant bit of the 10-bit data bus in the transit and receive buses carries an even parity bit, the next most-significant bit indicates a delimiter signal, and the remaining 8 bits carry the 8-bit data value without any coding. When transferring a data value, bit 8 of the transmit and/or receive data bus must be set to zero.

Control characters are indicated by logic "1" on bit 8 of transmit and/or receive data buses. These control characters correspond to the IDLE, BUSY, FILL and ERROR characters required by the message transfer and synchronization protocol. The different control characters are distinguished by the coding of the 8 least significant bits of the data bus.

Table E below describes the coding used in the clear-channel mode.

TABLE E

| DATA[9] | DATA[8] | DATA[7] | Interpretation |
| --- | --- | --- | --- |
| Even parity | 0 | 00000000 | Binary data value (00$_H$) |
| . | . | . | . |
| Even parity | 0 | 11111111 | Binary data value (FF$_H$) |
| Even parity | 1 | 00000001 | IDLE |
| Even parity | 1 | 00000010 | BUSY |
| Even parity | 1 | 00000100 | FILL |
| Even parity | 1 | 00001000 | ERROR |

With regard to ring flow control, each ES node can implement a flow control protocol to avoid a capture effect between upstream and downstream nodes on a given ring. The capture effect can occur under traffic patterns in which a high proportion of the ring traffic is exchanged between upstream nodes, thus depriving downstream nodes of access opportunities. In this case, the downstream node would be unable to transmit locally generated data onto the ring because its upstream neighbors transmit without gaps, thereby filling up its bypass queue FIFO and preventing the node's transmit FIFO from being emptied. A flow control mechanism is thus used to allow downstream nodes to signal upstream nodes to pause or cease transmission when capture effect occurs, and us provide fair transmit opportunities for downstream nodes. Thus this mechanism ensures fair sharing of ring bandwidth, particularly when the ring utilization equals or exceeds the ring capacity, while at the same time using a simple, stateless protocol which does not consume significant ring bandwidth.

Preferred encoding of the flow control symbol pairs in clear-channel mode is described in Table F below.

TABLE F

| Indication | Code Pair | DATA[9:0]Encoding |
| --- | --- | --- |
| NBI (not busy, idle) | IDLE, FILL | $101_h, 104_h$ |
| NBD (not busy, data) | IDLE, DATA | $101_h, 000\text{-}OFF_h$ |
| BI (busy, idle) | BUSY, FILL | $102_h, 104_h$ |
| BD (busy, idle) | BUSY, DATA | $102_h, 000\text{-}OFF_h$ |

Every ES and IS node that is present on any ring should be assigned a range of one or more unique addresses by which it may be identified to all other nodes in the system. These addresses are used to route messages to their target, as well as to identify the sources of messages. Each distinct address is referred to herein as a logical port. A logical port may represent any entity, hardware or software, that is capable of accepting, generating or handling messages carried by the system. The same entity may be assigned more than one logical port to use as a source or destination address. However a single logical port should not be assigned to more than one distinct entity, except in the case of broadcast addresses, to be described later. The entity designation also includes resources associated with the node.

In the example system described herein, the 10 bits are sufficient to identify any of 1023 logical ports, whether source or destination. However, other numbers of bits and other corresponding numbers of logical ports can be used in a system.

Messages are routed to their various targets using a 10-bit destination address field in each message, and the source of the message is identified by another 10-bit source address field. These fields should be set properly by the originating node before transmitting the message. No message should be injected into any ring without valid source and destination addresses that permit both the originating node and target node of the message to be unambiguously identified.

The message format is illustrated in FIG. 7. The bus messages are preferably octetoriented, little endian (least significant byte transmitted first). A delimiter byte is first in the message, followed by a hopcount byte which indicates how many nodes the message is to pass through to get to its destination. The next byte is formed of a 4 bits to designate the message type, 2 bits can be reserved, and two bits of the destination address. The next byte contains the remainder of the destination address. The next byte is formed of 6 reserved bits and two bits of a source address (SRC). The next byte contains the remainder of the source address. This is followed by payload bytes (0:N).

The bit field definitions can be extended with a modification of the type and reserve fields, and all (n) bit fields can be extended to accommodate larger fields for addressing (destination DEST address and source address SRC in particular).

All messages should contain the first six bytes shown in FIG. 7. The payload data fields are optional, and are used only for data bearing messages (which are identified by specific TYPE codes). For short control-oriented messages a different 6 byte format can be used.

The mapping of resources implemented within or in association with nodes, to logical ports in the system is implementation dependent, and may change over time during normal system operation. For example, it may be desirable to implement one type of mapping during system initialization, and another during operation, provided that the addressable resources possess unique logic port indices. The nature of the resources that are mapped to port indices is also implementation dependent.

Any node which contains at least one resource mapped to a logical port is considered to be capable of terminating messages, as it is required to accept and remove any and all messages that are targeted at that logical port. All ES nodes should be capable of terminating messages, but it is optional for IS nodes to be able to terminate messages.

The logical port addresses (e.g. all bits set to a logical "1", or 1023 decimal) is designated as a broadcast address, and is reserved for the implementation of a broadcast mechanism on the bus. If any node receives a message directed at the broadcast address, it is required to process the message internally in addition to passing a copy of the same message, unchanged except for a decrement of the value in the hopcount field, to the next downstream node via the egress port.

If an IS node receives the message, it should broadcast the message on all of its ports that are enabled to transfer broadcast messages, with the hopcount fields in the messages handled appropriately. It is implementation dependent as to whether an IS node may be configured to selectively forward broadcast messages on to specific rings. If an IS node is capable of terminating messages (e.g. to permit access to internal control and status registers), it should also respond to broadcast messages in a manner similar to ES nodes.

The processing of broadcast messages by a node is implementation dependent. However if an ES or IS node implements multiple logical ports assigned to multiple internal resources, it need not deliver multiple copies of a single broadcast message to all of its internal resources. For example, broadcast messages may be used for performing device polling and topology discovery after power-up, as well as dynamic configuration management functions.

A node may also optionally inspect the message type field within broadcast messages in order to determine which messages it will respond to, and which messages should be considered an error.

Messages addressed to a reserved broadcast port index should not be removed from the ring under normal circumstances. However proper removal is required to prevent both infinite recirculation of messages and also to keep an excessive number of copies of the same message from being received by the devices on the ring. The originating node of a broadcast message on a specific ring (i.e. either an ES or IS node that relays a broadcast message) should properly set the hopcount field to cause the message to be removed from the ring and be discarded after a short period of time. The precise value to be used for the hopcount field is implementation specific.

All transactions on the bus take place by the exchange of well-defined messages. A message is a structured group of data characters that is originated by a source node and is directed at one or more destination nodes, which can include the source device. It should be noted that the use of a message based protocol renders the architecture almost completely stateless; individual devices need to maintain very little auxiliary information to implement the message exchange protocol, as most of the required data are in the messages themselves.

As a stateless protocol, the formats and interpretations of the messages almost completely define the protocol. The message definitions can be extended, or new message types can be created to provide for expansion of the bus capabilities. Interoperability through the ring is maintained by forcing all nodes residing on the ring to remove(and possibly discard) messages which are specifically addressed to them, regardless of message type, and to bypass all other messages to downstream devices.

Because of the 8B/10B encoding rules for running disparity and comma detection, all messages should have an even number of bytes, including the IDLE/BUSY delimiter which denotes the start of a message.

It is preferred to define 8 different types of messages as follows.

Queue allocate messages should be generated by a source ES node to notify a single destination ES node that a message (typically a packet or a frame) is ready for transmission on the specified destination port. Two kinds of queue allocate messages should be generated: unicast queue allocate messages, which signal the presence of unicast messages, and multicast queue allocate messages, which are used for multicast messages.

Queue fetch messages should be generated from a destination ES node to a source ES node to request that up to a predetermined maximum block size of message data should be sent from a source node to a specific destination port contained in a destination node.

Data block messages should be used by a source ES node to transfer message data to a specified destination port. The last data block message (identified by the EOF flag in the message header) signals termination of transmission of the message after all the data have been transmitted.

Flush messages are used to remove a received message, or one that is in the process of being received, from the head of the specified output queue. Flush messages should also be used in place of start message command messages to delete the head entry in the specified transmit queue rather than initiate message transmit.

Control and Status messages should be used to write to specific ES node communication and control registers or local memory addresses, and to read from specific ES node status registers or local memory. They are intended primarily to be used by embedded CPUs in the system to initialize and control the ES nodes, and to inter-communicate in order to maintain the distributed address table and SNMP management information base.

The preferred communication protocol allows a set of devices to communicate with each other by means of a set of variable-length messages. All message transfer, initialization, configuration, diagnostics and inter-device communication should be carried out using these messages.

The protocol is preferably as far as possible stateless. Individual messages contain most of the information needed to process them. This results in very little state information required to be maintained in the nodes in order to handle message traffic. It also has the desirable property that isolated portions of the protocol can be utilized for different (non-standard) purposes relatively easily.

In general, a switch network implemented using the present invention receives Ethernet™ frames of data at an ingress port, performs an address resolution process to determine the target of the frames, forwards or filters the frames accordingly, and finally retransmits the forwarded frames out of its egress port or ports.

The data is physically buffered upon input, but is queued according to destination port. As a result, the node will behave as an output buffered switch but with an overhead which requires querying the destination as to its available bandwidth. A distributed address table should be maintained by port control devices to enable the physical destination port or ports to be determined using the destination MAC address in the frame. Buffer memory is also required for temporary frame storage at the port devices.

The principal transactions on the bus are Queue Allocates, Queue Fetches and Data Transfers. FIG. 8 duplicates FIG. 1 and adds additional aspects to the skeleton. The sequence of steps is as follows;

Step 1: Frame reception begins at the ingress port. The receiving node allocates buffer space within its local buffer memory and begins copying the incoming data to the buffer.

Step 2: When the frame header has been received, an ingress port controller of the node determines whether the frame is to be forwarded or filtered. If it is to be forwarded, the frame is passed into a locally maintained output queue corresponding to the target node ingress port. The number of output queues is equal to the number of destination ports in the system.

Step 3. When the frame is ready for forwarding, the source ES node issues a queue allocate message to the destination ES node via the ring interface. The timing of the queue allocate message with respect to the status of the incoming frame (and that of the preceding frames) is dependent on the ES node architecture. For example, an implementation may issue a queue allocate immediately after the forwarding decision has been made to implement cut-through switching. An alternate implementation may delay the transmission of the message until the entire frame has been received properly (as in the case of store-and-forward switching).

Step 4. When the destination ES device receives the queue allocate message, it should record the source port originating the message in a locally maintained transmit queue.

Step 5. When the destination ES node is ready to accept the frame from the source device, it should look up its queue of pending transmit requests for the specified port. The entry created in Step 4 should be extracted and a queue fetch message sent to the source ES node.

Step 6. In response to the queue fetch message, the source ES node should send up to a predetermined maximum data block of the received frame to the destination ES node in the form of a data block message. Only one data block message should be sent in response to each queue fetch. The destination ES node therefor may issue multiple queue fetch messages as needed in order to obtain frames that are larger than the maximum data block.

Step 7. When the destination ES node receives the data block message(s), it should enter an internal FIFO (first-in first-out register), and begin transmitting via the egress port to the destination node.

Step 8. The block transmission continues, repeating steps 6 and 7 until the entire frame has been transferred. The source ES node should set the EOF flag in the last data block message to indicate that the entire frame has been transferred, and that no more data are available. The destination ES node then becomes responsible for completing the transmission of the frame and performing any processing required at the end of a frame transfer.

The timing and sequencing of the queue allocate, queue fetch and data block messages are dependent on the implementation of the ES node (or any other equivalent devices resident on the ring), and is not determined by the protocol. It is possible, for example, to omit portions of the protocol described above (e.g. data block messages could be sent without any preceding queue fetch message) depending on the ES node architecture.

The process of initializing a ring and commencing normal operations involves the physical startup of the rings (e.g.

clock synchronization), discovering nodes that are attached to the rings, setting up these nodes and finally entering the normal operating mode of the system.

At power-on (or reset) time, all nodes on a given ring should synchronize their clocks and also achieve coherent framing of data. To this end, each node (whether ES or IS) attached to a ring should perform three functions immediately after system reset:

1. It should immediately begin generating and driving a clock signal of the proper frequency to its downstream neighbor, and start looking for and accepting a clock signal from its upstream neighbor.
2. It should place a continuous stream of IDLE characters on the downstream data bus.
3. It should look for, and frame to, IDLE characters which are being received on its upstream (ring ingress) data bus.

Each device should implement a control register that should contain a predetermined number of valid IDLE characters that should be received for the device to be synchronized. Once the device has detected at least that number of consecutive IDLE characters received on its upstream data ingress bus, it should consider the upstream link as being active and properly synchronized. It should then begin looking for the IDLE/BUSY character that delimits the start of a message define by the protocol. Until the device has detected at least this number of consecutive idle characters, it should reject all other characters.

The systems that use the ring which uses this invention should be capable of automatically configuring and initializing themselves upon power-up, or during normal operation when nodes are added to or are removed from the system. The configuration procedure can be carried out using a master processor (CPU), which may be present either in one of the nodes or may be completely separate from any of the ES and IS nodes. The master CPU should be responsible for recognition of nodes attached to the ring, both upon power-up and during normal operation, and when changes in the configuration are encountered, re-initializing and restarting the system.

To facilitate the process of automatic discovery and configuration of devices present in a ring, every device that participates in the protocol should implement three registers that are accessible to the master CPU: (a) a device identification register, (b) a device control register, and (c) a device status register.

These registers should always be mapped into the node register space at register indices 0, 1 and 2 respectively as presented to the ring. It should always be accessible for read and write via control and status messages from the ring port(s), regardless of the internal state of the device. Thus the CPU will always be able to access these registers by sending control messages, and cause each node in the ring to send messages as to the contents of the registers to the node containing the CPU, whereby it can determine the identification and status of each node in the ring.

It will be recognized that the concepts of the present invention can be realized using different data structures. The functions of these different data types and addressing should be similar in other implementations in order to maintain compatibility between nodes in the system. Header ordering, data field widths, naming conventions and data block sizing may be modified while utilizing the benefits of the present invention.

The point-to-point bus nature of the present invention makes it possible to directly connect devices in a ring. However, the use of a switch fabric is also possible since the protocol isolates inputs and outputs in near-stateless autonoma. Widths and timing of the buses could be modified but the point-to-point electrical characteristics and dissociation of input to output should be maintained.

In addition, alternative encoding methods could be employed to provide an embedded signalling for flow control.

A person understanding this invention may now conceive of alternate embodiments and enhancements using the principles described herein. All such embodiments and enhancements are considered to be within the spirit and scope of this invention as defined in the claims appended hereto.

We claim:

1. A method of communicating packet data in a unidirectional single-ring network comprised a plurality of end system (ES) nodes utilizing a messaging protocol, each of said plurality of ES nodes distinguishing between data messages and control messages and comprising:

a unidirectional ingress port interface and a unidirectional egress port interface, wherein said egress port interface is connected to said ingress port interface of a first ES node of said plurality of ES nodes, and said ingress port interface is connected to said egress port interface of a second ES node of said plurality of ES nodes;

a fixed and unique address associated with each of said plurality of ES nodes to distinguish between each of said plurality of ES nodes;

address comparator means that compares the address fields within messages of said messaging protocol with said fixed address of a particular ES node of said plurality of ES nodes, to determine whether said messages are destined for said particular ES node;

a receive buffer coupled to said ingress port interface of said particular ES node, containing said data messages that are determined to be destined for said particular ES node according to said comparison:

a bypass buffer coupled to said ingress port interface and said egress port interface of said particular ES node containing said messages that are not destined for said particular ES node according to said comparison;

a plurality of transmit buffers coupled to said egress port interface of said particular ES node, wherein the number of transmit buffers is equal to the number of said plurality of ES nodes in said network, and each transmit buffer is uniquely associated with a corresponding one of said plurality of ES nodes in said network, and each transmit buffer holds packet data to be sent to said corresponding one of said plurality of ES nodes;

arbitration means coupled to said egress port interface, said bypass buffer and said transmit buffers of said particular ES node, operative to select packet data to be transmitted on said egress port interface from either said bypass buffer or said transmit buffers according to a predetermined algorithm;

a table of pending transfer requests from said plurality of ES nodes in the network, that may be scanned in parallel to determine an optimal transfer request to select and authorize from the set of said transfer requests;

a queue of pending transfer authorizations from said plurality of ES nodes in said network, and a message transfer protocol utilizing control and data messages said method comprising the steps of:

m) issuing a transfer request control message to a destination ES node in said network, if said transmit buffer for said destination ES node within a source ES node contains at least one complete packet;

n) updating of the entry corresponding to said source ES node in said table of pending transfer requests in said destination ES node, upon receipt of said transfer request control message by said destination ES node;

o) inspecting all the entries in said table of pending transfer requests in said destination ES node, and selecting said source ES node issuing said transfer request for transfer authorization;

p) issuing a transfer authorization control message to said source ES node, if space is available in said receive buffer to hold at least one of said data messages;

q) placing said transfer authorization control message in said queue of pending transfer authorizations when received by said source ES node; and r) removing the first entry in said queue of pending transfer authorizations in said source ES node, decoding said transfer authorization control message, and sending said packet data from the corresponding one of said transmit buffers to said destination ES node.

2. A method as defined in claim 1, including determining at the destination ES node that the message frame is incomplete, and repeating steps (a) through (f) for successive data blocks of the message frame repeatedly until the entire message frame has been received.

3. A method as defined in claim 2 including recognizing the completion of reception of the entire message frame by detecting an end of frame (EOF) flag in the last data block of the message frame.

4. A method as defined in claim 2 including maintaining at the destination ES node a table of destination port addresses, allocating a buffer to each destination port address to which a message frame is being addressed, and directing data from the respective buffers to the respective port addresses according to a predetermined protocol.

5. A method as defined in claim 1 including allocating messages directed to resources at a third ES node to a bypass queue, allocating messages directed to resources associated with the destination ES node to a receive queue, allocating messages originating at resources associated with the destination ES node to a transmit queue, and arbitring the transfer of messages in the bypass queue and messages in the transmit queue to the egress port of the destination ES node.

6. A method as defined in claim 1 in which each message data block includes unique control characters including idle and busy control and synchronization characters, said method further including padding each message data block with fill characters so as to obtain an odd number of bytes of idle and/or busy control characters.

7. A method as defined in claim 6 in which the data message is embedded in the data block using an 8B/10B coding scheme, the method including padding each message data block with FILLP characters when running disparity is positive, and with FILLN characters when running disparity is negative.

8. A method as defined in claim 7 wherein no FILLN or FILLP characters are added in the event the number of data bytes in the message data block is odd.

9. A method as defined in claim 6 in which each message data block is binary coded, and includes a parity bit, a delimiter signal and a data value.

10. A method as defined in claim 4 including allocating messages directed to resources at said a third ES node to a bypass queue, allocating messages directed to resources associated with the destination ES node to a receive queue, allocating message originating at resources associated with the destination ES node to a transmit queue, and arbiting the transfer of messages in the bypass queue with messages in the transmit queue to the egress port of the destination ES node.

11. A method as defined in claim 4 in which each message data block includes unique control characters including idle and busy control and synchronization characters, said method further including padding each message data block with fill characters so as to obtain an odd number of bytes of idle and/or busy control characters.

12. A method as defined in claim 5 in which each message data block is comprised of unique control characters including idle and busy control and synchronization characters, said method further including padding each message data block with fill characters so as to obtain an odd number of bytes of idle and/or busy control characters.

13. A method as defined in claim 10 in which each message data block is comprised of unique control characters including idle and busy control and synchronization characters, said method further including padding each message data block with fill characters so as to obtain an odd number of bytes of idle and/or busy control characters.

14. A method as defined in claim 4 in which each message data block includes a delimiter byte, a hopcount byte, a byte defining at least frame type and part of a destination address, a byte defining the remaining destination address, a byte defining a checksum, and a number of plural bytes required to fill said predetermined size of data block.

15. A method as defined in claim 1 in which the nodes of the network are comprised of end system nodes end intermediate switching fabric nodes, and providing a transmission path from every end system node to itself and to every other end system node via ingress and egress ports of various end system and intermediate switching fabric nodes.

16. A method as defined in claim 15 including providing the intermediate switching fabric with plural ingress ports and plural egress ports and buffering messages received at respective ingress ports to respective egress ports determined by a destination address contained in each of the respective messages.

17. A unidirectional single-ring network comprised a plurality of end system (ES) nodes utilizing a messaging protocol, each of said plurality of ES nodes distinguishing between data messages and control messages and comprising:

a unidirectional ingress port interface and a unidirectional egress port interface, wherein said egress port interface is connected to said ingress port interface of a first ES node of said plurality of ES nodes, and said ingress port interface is connected to said egress port interface of a second ES node of said plurality of ES nodes;

a fixed and unique address associated with each of said plurality of ES nodes to distinguish between each of said plurality of ES nodes;

address comparator means that compares the address fields within messages of said messaging protocol with said fixed address of a particular ES node of said plurality of ES nodes, to determine whether said messages are destined for said particular ES node;

a receive buffer coupled to said ingress port interface of said particular ES node, containing said data messages that are determined to be destined for said particular ES node according to said comparison;

a bypass buffer coupled to said ingress pod interface and said egress port interface of said particular ES node containing said messages that are not destined for said particular ES node according to said comparison;

a plurality of transmit buffers coupled to said egress port interface of said particular ES node, wherein the number of transmit buffers is equal to the number of said plurality of ES nodes in said network, and each transmit buffer is uniquely associated with a corresponding one of said plurality of ES nodes in said network, and each transmit buffer holds packet data to be sent to said corresponding one of said plurality of ES nodes;

arbitration means coupled to said egress port interface, said bypass buffer and said transmit buffers of said particular ES node, operative to select packet data to be transmitted on said egress port interface from either said bypass buffer or said transmit buffers according to a predetermined algorithm;

a table of pending transfer requests from said plurality of ES nodes in the network, that may be scanned in parallel to determine an optimal transfer request to select and authorize from the set of said transfer requests;

a queue of pending transfer authorizations from said plurality of ES nodes in said network, and a message transfer protocol utilizing control and data message.

* * * * *